No. 735,245. PATENTED AUG. 4, 1903.
D. T. GOODMAN.
HOOK.
APPLICATION FILED MAY 26, 1903.
NO MODEL.

Witnesses

Inventor
D. T. Goodman

No. 735,245. Patented August 4, 1903.

UNITED STATES PATENT OFFICE.

DAVID T. GOODMAN, OF ALTOONA, PENNSYLVANIA.

HOOK.

SPECIFICATION forming part of Letters Patent No. 735,245, dated August 4, 1903.

Application filed May 26, 1903. Serial No. 158,838. (No model.)

*To all whom it may concern:*

Be it known that I, DAVID T. GOODMAN, a citizen of the United States, residing at Altoona, in the county of Blair, State of Pennsylvania, have invented certain new and useful Improvements in Hooks; and I do hereby declare the following to be a full, clear, and exact description of the invention, such as will enable others skilled in the art to which it appertains to make and use the same.

This invention relates to wrecking-tackle such as is employed in wrecking operations on railways; and it has for its object to provide a hook which may be connected with the draw-head of that style of Janney coupler wherein the knuckle is solid to facilitate the attachment of a cable for moving the car.

A further object of the invention is to provide a hook which may be easily and quickly engaged with the draw-head, which will be held securely in place when the strain on the hook is relieved, and which furthermore may be readily disengaged when desired.

Figure 1:
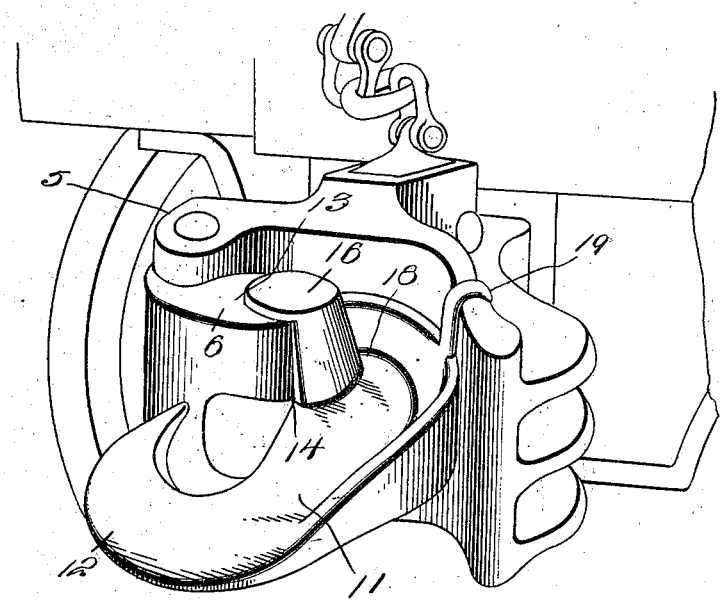
Figure 2:
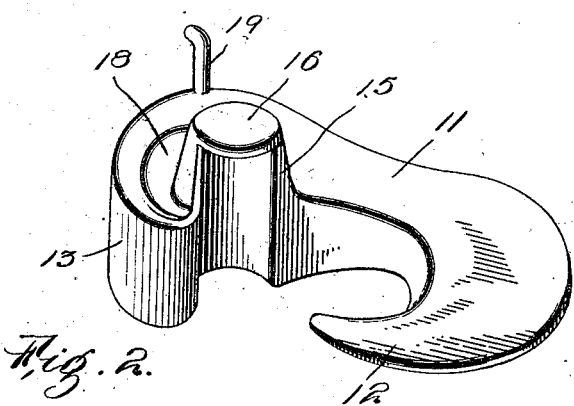

In the drawings forming a portion of this specification and in which like numerals of reference indicate similar parts in the several views, Figure 1 is a perspective view showing the hook engaged with the draw-head of a coupler. Fig. 2 is a perspective view of the hook disengaged from the coupler.

Referring now to the drawings, there is shown a draw-head 5 of the well-known Janney type and to which is pivoted the knuckle 6. The present hook is designed for connection with this knuckle, so that a cable or chain may be attached during the operation of wrecking or switching or whenever else desired.

The hook embodying the present invention comprises a stem 11, having the bill 12 at one end, the stem of the hook being gradually increased in thickness from the bill to the opposite end of the stem in a direction at right angles to the plane of the hook, and at the free end of the stem is a foot 13, which projects laterally from the stem in the plane of the hook, and which foot terminates slightly beyond the extremity of the bill of the hook. The face of the foot next to the bill of the hook and which for convenience may be termed the "inner" face of the hook has an arc-shaped cavity therein, the curvature of this cavity reaching from the lower edge of the foot upwardly through the foot and into the enlargement 15 upon the upper face of the foot, and which enlargement extends in the form of a shell or wall to the inner face of the stem of the hook. The arc-shaped cavity of the foot 13 is closed at its upper end, as shown at 16. The upper and lower faces of the butt-end of the stem of the hook are channeled, as shown at 18, to reduce the weight of the hook.

In practice the hook is disposed so that the convex inner face 14 of the knuckle of the draw-head engages in the concavity of the foot and the enlargement 15 thereof, the upper end wall of the concavity resting upon the upper face of the knuckle, so that when the hook is relieved from strain of a rope engaged therewith it will not fall away from the draw-head, but will remain in place. As an additional means for holding the hook to the draw-head when the hook is relieved of strain a hanger 19 is provided in the form of a hook, the stem of which is mounted at or adjacent to the edge of the foot opposite to the enlargement 15. This hanger may be pivotally mounted, so that its extremity may be swung laterally to suit different specific conditions, and when the foot is engaged with the knuckle of the draw-head this hanger may be engaged with its free end or extremity upon the draw-head, when it will keep the hook from sliding downwardly. It will be noted that neither of the retaining means for the hook will interfere with the rapid application and removal of the hook.

It will be understood that in practice modifications of the specific construction shown may be made and that any suitable materials and proportions may be used for the various parts without departing from the spirit of the invention.

What is claimed is—

1. A wrecking-hook comprising a stem having a bill at one end and a foot at its opposite end projecting laterally from the stem in the plane of the hook and beyond the extremity of the bill of the hook, the face of the foot adjacent to the bill being concaved.

2. A wrecking-hook comprising a stem having a bill at one end and a foot at its opposite end projecting laterally from the stem in the plane of the hook, and a hanger carried by the hook.

3. A wrecking-hook comprising a stem having a bill at one end and a foot at its opposite end projecting laterally from the stem in the plane of the hook, the face of the foot adjacent to the bill being concaved, and a hanger carried by the hook for engagement upon a drawhead.

4. A wrecking-hook comprising a stem having a bill at one end and an enlargement at its opposite end projecting at right angles to the plane of the hook, said opposite end portion of the stem having a concavity in its face opposite to the bill of the hook, said concavity being continued into said enlargement, the end of the concavity in the enlargement being closed and the opposite end of the concavity being open.

5. A wrecking-hook comprising a stem having a bill at one end and having its opposite end enlarged at the same side of the stem with the bill of the hook, said enlarged portion having a concavity in its face adjacent to the bill of the hook and having an upwardly-projecting portion into which the concavity is extended.

In testimony whereof I affix my signature in presence of two witnesses.

DAVID T. GOODMAN.

Witnesses:
 FREDERIC OTTERBEIN,
 A. C. REED.